United States Patent Office 3,322,703
Patented May 30, 1967

3,322,703
REMOISTENABLE ADHESIVES ADMIXED WITH VINYL ACETATE-ALKOXY POLYALKYLENE GLYCOL COPOLYMERS
Martin K. Lindemann, Somerville, N.J., assignor, by mesne assignments, to Cumberland Chemical Company, New York, N.Y., a corporation of Delaware
No Drawing. Filed Jan. 28, 1963, Ser. No. 254,435
20 Claims. (Cl. 260—8)

This invention relates to remoistenable adhesive materials and gummed sheet materials and gummed products having an adhesive coating capable of developing adhesive tackiness when moistened with water, and is more particularly concerned with the use of water insoluble-organic solvent soluble polymeric materials and water soluble-organic solvent insoluble adhesives in the preparation of remoistenable adhesive materials and compositions, remoistenable adhesive coatings, and gummed products. This invention is also concerned with the preparation of polymerizable monomeric alkoxy polyalkylene glycol unsaturated acid half esters and the preparation of copolymers of vinyl acetate and said polymerizable half esters.

Gummed materials and gummed products or articles containing a coating of a remoistenable adhesive are well known in the art. Generally, these articles consist of a dried film of a remoistenable adhesive on paper, or fabric, or similar material. When this dried film is moistened with water, it becomes tacky and one may apply the article to another surface; resulting in the bonding of the gummed article to the other surface. Specific gummed articles include gummed labels, postage stamps, and envelopes. It is well known in the art that difficulties and problems arise in the preparation, storage, and use of gummed products. One major problem is the tendency of the gummed product to curl and buckle. Also the remoistenable adhesive may be affected by changes in atmospheric moisture content; this may result in blocking problems. That is, the adhesive may become tacky and adhere to an adjacent gummed article. In general, the problem of storage instability of gummed articles and products is well known in the art.

To solve these problems, many procedures, techniques, and formulations have been proposed and suggested in the prior art. While these proposals have merit, they have not entirely solved the problems associated with the preparation of gummed products. A specific group of suggested techniques relates to combining water soluble adhesives or water soluble polymeric materials with the usual remoistenable water soluble adhesive. With these techniques one obtains a dried film or coating that is a mixture of the water soluble material and adhesive. While generally giving improved products, these techniques can present problems relating to the complex solvent systems used for the coating mixture applied to the paper, the large amounts of expensive water soluble polymeric material may be required to produce a satisfactory product; and the problem of storage instability, since the film or coating is composed entirely of water soluble materials.

It is, therefore, an object of this invention to provide improved remoistenable adhesive materials, compositions, and coatings.

Another object is to provide gummed paper products, articles, and materials having improved remoistenable adhesive coatings and films.

A further object is to prepare polymerizable monomeric acid half esters from alkoxy polyalkylene glycols and unsaturated acid materials.

A still further object is to provide vinyl acetate-alkoxy polyalkylene glycol dicarboxylic acid half ester copolymers.

Another object is to provide copolymers of vinyl acetate and methoxy polyethylene glycol maleate half esters.

These and other objects, as well as advantages and other benefits of this invention, and other novel and specific features of this invention, will become apparent, or will be clarified or will be specifically detailed in the following descriptions, illustrations, and examples of this invention.

In accordance with this invention remoistenable adhesive materials are prepared using a remoistenable adhesive that is water soluble and organic solvent insoluble, and a polymeric material that is water insoluble and organic solvent soluble. The resulting gummed sheet or product contains a coating comprising a mixture of the water soluble-organic solvent insoluble remoistenable adhesive and the water insoluble-organic solvent soluble polymeric material. Suitable polymeric materials include vinyl acetate-alkoxy polyalkylene glycol unsaturated dicarboxylic acid half ester copolymers, such as vinyl acetate-methoxy polyethylene glycol maleic acid half-ester copolymers, and vinyl acetate-methoxy polyethylene glycol fumaric acid half ester copolymers, vinyl acetate-alkoxy polyalkylene glycol unsaturated monocarboxylic acid copolymers, such as vinyl acetate-alkoxy polyethylene glycol crotonic acid ester copolymers; vinyl acetate-alkoxy polyethylene glycol acrylic acid ester copolymers; and vinyl acetate-alkoxy polyethylene glycol methacrylic acid ester copolymers. In general, the gummed products of this invention are prepared by first forming an adhesive mixture or coating composition, of the remoistenable adhesive and the water insoluble polymeric material; that comprises a solution of dispersion or suspension of the adhesive in a solvent system. The coating composition or mixture is then applied to the paper or fabric surface to form a uniform coating; solvent is removed and a gummed article having a substantially dry film of remoistenable adhesive—and polymeric material—is obtained.

Polymeric materials especially useful in this invention comprise water insoluble-organic solvent soluble vinyl acetate copolymers. The monomer copolymerized with vinyl acetate can be an alkoxy polyalkylene glycol unsaturated carboxylic acid ester. The copolymers may be prepared by the well known free radical initiated copolymerization technique. Preferred copolymers are vinyl acetate-alkoxy polyalkylene glycol unsaturated dicarboxylic acid half esters copolymers, and more specifically copolymers based on methoxy polyethylene glycol maleate half esters.

Polymerizable monomeric acid esters are prepared from alkoxy polyalkylene glycols and unsaturated acid materials; that is, acids or acid anhydrides may be used. The reaction of the glycol and acid type compound is an esterification reaction; and, in general, any suitable esterification procedure may be employed. Monomers prepared from unsaturated dicarboxylic acid materials are especially useful for preparing the previously mentioned vinyl acetate copolymers. Preferred monomers are methoxy polyethylene glycol maleate half esters.

Gummed products prepared according to this invention contain a coating or film of a remoistenable adhesive mixture. A remoistenable adhesive has the property of becoming sticky or tacky, when it is moistened; this allows the tacky adhesive to be applied to another surface; resulting in the adhesive adhering to the surface to which it is applied. The major use of remoistenable adhesives is in the preparation of gummed products or gummed articles and materials having a substantially dry coating of a remoistenable adhesive. When the coating is moistened, the gummed article may be attached to another surface and remain attached, because of the adhesive bond formed between the article and the other surface. Gummed products include gummed paper and gummed cloth or fabric; specific gummed products include stay paper, sealing tape, veneer tape, gummed labels, postage stamps, envelopes, and bags. The procedures and techniques of this invention are particularly applicable to the preparation of gummed paper sheet materials and products. Advantageous and useful gummed products are prepared by utilizing an improved adhesive mixture or coating composition comprising a water soluble-organic solvent insoluble remoistenable adhesive or glue and a water insoluble-organic solvent soluble polymeric material. The usual water soluble-organic solvent insoluble remoistenable adhesives may be used in the practice of this invention; included are animal glues, bone glues, dextrines, starches, starch ethers, chlorinated starches, gums, polysaccharides, tapioca dextrine, potato dextrine, and corn dextrine. Also included are certain polyvinyl alcohols, polyvinyl alkyl ethers, polyvinyl pyrrolidones, vinyl alkyl ether-maleic anhydride copolymers, vinyl acetate copolymers, and carboxy methyl cellulose. The former and/or latter adhesives may be utilized as mixtures. The latter group of adhesives covers only those polymers that are remoistenable adhesives; as polymerization techniques can be varied to produce polymers named that are not remoistenable adhesives. The remoistenable adhesive or mixture of remoistenable adhesives used is soluble in water and insoluble in organic solvents or organic solvent mixtures. Also a water solution of the remoistenable adhesive should be insoluble in organic solvents.

The water insoluble-organic solvent soluble polymeric material used in the improved coating composition is preferably a vinyl acetate copolymer. Suitable copolymers include vinyl acetate-alkoxy polyalkylene glycol unsaturated carboxylic acid esters, especially vinyl acetate-alkoxy polyalkylene glycol unsaturated dicarboxylic acid half ester copolymers, such as vinyl acetate-methoxy polyethylene glycol maleic acid half ester copolymers and vinyl acetate-methoxy polyethylene glycol fumaric acid half ester copolymers; vinyl acetate-alkoxy polyalkylene glycol unsaturated monocarboxylic acid esters copolymers, as, vinyl acetate-alkoxy polyethylene glycol crotonic acid esters copolymers, vinyl acetate-alkoxy polyethylene glycol acrylic acid ester copolymers, and vinyl acetate-alkoxy polyethylene methacrylic acid esters copolymers. However, vinyl acetate-alkoxy polyalkylene glycol unsaturated polycarboxylic acid esters, such as vinyl acetate-alkoxy polyalkylene glycol sorbic acid ester copolymers, may be used. Vinyl acetate-alkoxy polyalkylene glycol copolymeric materials, and vinyl acetate polyalkylene glycol copolymeric materials, may also be used. The vinyl acetate copolymers and vinyl acetate copolymeric materials are those that are water insoluble and organic solvent soluble; since it may be possible, by incorporating large amounts of polyalkylene glycol materials in the copolymer, to produce a vinyl acetate copolymer that is not water insoluble. Additionally the polymeric materials should not be alkali-soluble; that is soluble in water solutations containing alkali materials. In practically all cases, the above-mentioned vinyl acetate copolymers and polymeric materials are not remoistenable adhesives. The polymeric material is soluble in organic solvents, or solvents mixtures, as aliphatic alcohols, hydro-carbons, ketones, esters, and aromatic compounds; specific compounds as methyl alcohol, ethyl alcohol, isopropyl alcohol, butyl alcohol, hexane, cyclohexane, nitroethane, nitroparaffin, acetone, methyl ethyl ketone, cyclohexanone, ethyl acetate, toluene, benzene, and xylene. The water soluble remoistenable adhesive or water solution of the adhesive should be insoluble in these solvents.

The improved gummed products of this invention are prepared by utilizing the adhesive mixture or remoistenable adhesive coating compositions of this invention. These remoistenable adhesive products are produced, in general, by procedures well known in the art and well known to those skilled in the art. Generally the water soluble-organic solvent insoluble remoistenable adhesive or mixture of remoistenable adhesives is added to a liquid medium, and a solution, or suspension, or dispersion, of the adhesive in the liquid medium is prepared. The adhesive-liquid medium coating composition is then applied to the paper or fabric sheet surface by any suitable coating technique, as spraying, casting, brushing, or dipping. The coated surface having a uniform film or coating of the adhesive-liquid medium composition is then dried; conventional drying techniques and equipment can be used. Continuous coating and continuous drying procedures are advantageous. The water insoluble-organic solvent soluble polymeric materials may be used to advantage in any of these procedures of preparing gummed products.

For example, the polymeric material may be dissolved in an organic solvent or solvent mixture and the remoistenable adhesive added to the solution, with agitation, to form a suspension or dispersion of the remoistenable adhesive in the solution of polymeric material. In another procedure the adhesive is dissolved in water and this solution is added to a solution of polymeric material in an organic solvent, to form a dispersion of the water-adhesive solution in the polymeric material solution. This technique may be modified by adding the polymeric material to the adhesive water solution to obtain a dispersion of the polymeric material in the adhesive solution; also the polymeric material may be added while dissolved in an organic solvent, to yield a dispersion of polymeric material solution in the adhesive water solution. Thus coating composition will consist of a dispersed phase in an adhesive solution or a polymeric material solution. The dispersed phase will be either a solution or solid particles of adhesive or particles of polymeric material. For more stable dispersions or suspensions and more satisfactory gummed products and ease of processing, it is advantageous to use the adhesive or polymeric material in solid particle form or solution form. That is, for example, if a dispersion of adhesive particles in a polymeric material solution is prepared; water should not then be added in attempting to dissolve the suspended adhesive. In general, dispersions of adhesive particles or a dispersion of an adhesive-water solution in a polymeric material organic solvent solution are the preferred coating compositions of this invention. However, the above techniques are subject to many variations, and in specific instances, some of these techniques may be used to advantage. Thus, when the adhesive is dissolved in water, it is usually more readily activated or develops tackiness more quickly when moistened. Also, a suspension of solid adhesive particles in a polymeric material organic solvent solution results in gummed products that have good storage stability and are less likely to be subject to curling or buckling.

The weight ratio of water soluble adhesive to water insoluble polymeric material can be varied over wide ranges when preparing coating compositions. Since the polymeric material is used mainly to obtain improved gummed products, and it is not generally a remoistenable adhesive, it is desirable to use small amounts of the polymeric material. That is, the amount of polymeric material should be varied, depending on the properties desired in the final gummed product or remoistenable coating. Satisfactory coating compositions can be prepared where the weight ratio of water soluble adhesive to water insoluble polymeric material is in the range from about 1:2 to about 100:1. It should be noted that the coating compositions may be prepared from mixtures of different water soluble adhesives and/or mixtures of different water insoluble polymeric materials. Preferred coating compositions have an adhesive to polymeric material weight ratio of from about 2:1 to about 19:1.

Preferred compositions may be prepared by first dissolving the polymeric material in one of the organic solvents previously named or mixtures of these solvents. With suitable agitation of this solution, solid particles of the adhesive or a water solution of the adhesive is added to the solution to form the coating composition dispersion or suspension. Many of the remoistenable adhesives are commercially available as fine powders that can be used directly; however, in some cases adhesive particle size reduction, as by grinding, may be necessary before the adhesive is added to the polymeric material solution. The water-adhesive solution may be heated, prior to forming the dispersion; and/or the polymeric material solution may be heated before adhesive addition.

Satisfactory improved coating compositions contain a total amount of adhesive and polymeric material in the range from about 20 percent to about 90 percent, by weight of the total coating composition; and the solvent system is in the range of from about 10 percent to 80 percent. If water solutions are used to prepare the coating compositions, the amount of water can be about from 10 percent to about 60 percent. The percentages are by weight based on the total weight of the coating composition. Advantageous coating compositions are those where the water soluble adhesive is about 19 percent to 89 percent, the polymeric material is about 1 percent to 50 percent, and the organic solvent system is about 10 percent to 80 percent, by weight of the total coating composition. Preferred coating compositions are those where the adhesive is about 45 percent to 65 percent, the polymeric material is about 5 percent to 20 percent, and the organic solvent system is about 20 percent to 50 percent, by weight of the coating composition.

Preferred water insoluble vinyl acetate copolymers and copolymeric materials are prepared by copolymerizing vinyl acetate with a copolymerizable monomeric ester material containing alkoxy poly-alkylene glycol or alkoxy alkylene glycol functions. For remoistenable adhesive compositions of this invention it is preferred that copolymer or material contain from about 75 percent to about 95 percent by weight of vinyl acetate and from about 5 percent to about 25 percent of the monomeric ester material. Further, the monomeric ester material should have an average molecular weight of from about 100 to about 1400.

Preferred polymeric materials for use in this invention are vinyl acetate-alkoxy polyalkylene glycol unsaturated dicarboxylic acid half esters copolymers that are insoluble in water, and soluble in organic solvents. Vinyl acetate-methoxy polyethylene glycol maleate half esters copolymers are of special advantage.

Other materials or compounds may be added to the coating compositions. These include well known additives; plasticizers, stabilizers; and other adhesive binders may also be added. Small amounts of surface active agents or dispersing agents may be added to assist in maintaining a stable coating composition. Materials as polyalkylene glycols and alkoxy polyalkylene glycols may be used as plasticizers, in small amounts. Also, small amounts of water soluble binder resins, as polyvinyl resins, may be added to the coating compositions. While not being bound by any theory or attempted explanation of improved results obtained using the procedures of this invention, it appears that the water insoluble-organic solvent soluble polymeric materials have advantageous film forming properties, when used with the adhesives, and results in improved gummed products. Improved storage stability of the products appears to result from the fact that the polymeric material is water insoluble and is not affected by moisture changes. Also, the water insoluble polymeric material acts as a bonding agent and assists maintaining the remoistenable adhesive film bonded to the gummed product surface; further the polymeric material maintains the remoistenable adhesive in a uniform, stable film structure. Another feature relates to protective action of the polymeric material in preventing the premature development of tackiness, while not interfering with the development of the desired tackiness when the film is moistened with water. Thus, the water insoluble polymeric material acts in some respects as a water proofing agent. While acting as a bonding agent, the polymeric material is advantageous as it prevents film separation from the article surface, because of its water insolubility. The polymeric material also acts as a plasticizer in the film. Whether these theories or suggested explanations of the improved results are entirely accurate; in no way affects the improved results and advantages obtained by utilizing the procedures of this invention.

As previously indicated vinyl acetate copolymers and vinyl acetate copolymeric materials are especially useful as the water insoluble-organic solvent soluble polymeric material used in preparing the improved remoistenable adhesive coating compositions of this invention. The vinyl acetate copolymers may be prepared by any of the well known free radical initiated copolymerization techniques. Vinyl acetate copolymeric materials include materials formed by a copolymerization of vinyl acetate and polyalkylene glycol compounds, as polyethylene glycols and alkoxy polyethylene glycols.

Particularly advantageous vinyl acetate copolymers are vinyl acetate-alkoxy polyethylene glycol dicarboxylic acid half esters copolymers. These copolymers are a preferred class of water insoluble polymeric materials. The polymerizable monomeric acid half esters copolymerized with vinyl acetate are esterification products of alkoxy polyalkylene glycols and unsaturated dicarboxylic acid materials. Specific water insoluble materials include vinyl acetate-methoxy polyethylene glycol maleate half ester copolymers; vinyl acetate-ethoxy polyethylene glycol maleate half ester copolymers, vinyl acetate-propoxy polyethylene glycol maleate half ester copolymers; vinyl acetate-methoxy polyethylene glycol furmate; and vinyl acetate-alkoxy polyalkylene glycol unsaturated dicarboxylic acid half esters copolymers prepared by using the copolymerizable monomeric acids described below. All of these last specific copolymers have not been named individually, but they are included in the class of materials useful in the procedures of this invention. Vinyl acetate-methoxy ethylene glycol acid half ester copolymers and vinyl acetate-methoxy diethylene glycol acid half ester copolymers are also included.

By preselection and control of the copolymerization conditions, a variety of vinyl acetate-alkoxy polyalkylene glycol dicarboxylic acid half esters copolymers may be produced. Copolymers containing varying amounts of vinyl acetate and having varying molecular weights may be produced. Vinyl acetate-half ester copolymers, containing from about 40 percent to about 95 percent by weight of the copolymers of vinyl acetate, and from about 5 percent to about 60 percent by weight of the copolymer of half ester have been found useful for a variety of applications. The copolymers of this invention are useful as oil additives, suspension agents in polymerization systems, textile treating agents, external plasticizers for polymeric materials as polyvinyl acetate, and adhesive additives. For example, there may be added about 1 percent to about 10 percent of the copolymer to mineral lubricating oils that are used in engines operating on petroleum fuels; this results in improved engine operation.

Vinyl acetate-half esters copolymers that contain from about 75 percent to about 95 percent vinyl acetate and from about 5 percent to about 25 percent half ester are preferred for the water insoluble polymeric material used in the remoistenable adhesive procedures of this invention. It should be noted that the percentage values of monomers or copolymers, or other materials defining copolymers or mixtures or compositions are based on the total weight of the copolymers or mixtures or compositions. In general all percentage values in this specification and claims are percentages by weight. These vinyl acetate-half ester copolymers preferred for adhesive procedures are prepared using the alkoxy polyalkylene glycol unsaturated acid half esters described below; and the average molecular weight of the copolymerizable half ester used in these copolymers should have an intrinsic viscosity of from about 0.1 dl./g. to about 1.5 dl./g. and more preferably an average molecular weight of from about 0.5 dl./g. to about 1.0 dl./g. Values of intrinsic viscosity herein were determined in acetone at 30° C. A specifically preferred water insoluble-organic solvent soluble vinyl acetate copolymer contains about 87 percent by weight vinyl acetate and about 13 percent by weight of alkoxy polyalkylene glycol dicarboxylic acid half ester and has an intrinsic viscosity in the range of about 0.5 to 1.0 dl./g.

All of the copolymers previously described may contain small amounts of other copolymerizable monomers, provided the essential characteristics of the copolymers are not markedly changed.

The vinyl acetate copolymers are prepared by copolymerization techniques using free radical initiators or free radical catalysts; solution, bulk, emulsion, suspension, bead, or solvent copolymerization techniques may be used. A preferred procedure is a free radical initiated solvent or solution polymerization system. This system is advantageous in that the copolymerizable monomeric ester can be made readily in a solvent as toluene; and the solvent used in the copolymerization system. Further, the copolymer produced is in solution and this solution can be used directly in many applications. For example, the copolymer solution can be used to prepare remoistenable adhesive compositions by procedures previously described. Useful solvents for the copolymeriaztion include aliphatic alcohols, hydrocarbons, ketones, esters, and aromatic compounds; specific compounds include methyl alcohol, ethyl alcohol, isopropyl alcohol, butyl alcohol, hexane, cyclohexane, nitroethane, nitroparaffin, acetone, methyl ethyl ketone, cyclohexanone, ethyl acetate, toluene, benzene, and xylene. Mixtures of solvents can be used. Selection of solvents or solvent mixtures should include consideration of various solvent effects on the molecular weight of the copolymer product. The well known azo type or peroxide type initiators may be used; as $\alpha,\alpha'$-azo diisobutyronitrile, benzoyl peroxide, capryloyl peroxide, lauroyl peroxide, and diisopropyl peroxydicarbonate.

Many variations in the copolymerization procedures are possible; but in general the desired quantities of the monomers—vinyl acetate and monomeric ester—are introduced into a suitable reaction vessel containing an amount of solvent system that is about one-half the volume of monomers to about equal to the volume of monomers. The initiator is added to the vessel separately or added with one or both monomers. The reaction mixture consists of the monomers dissolved in the solvent system and the polymerization catalyst. The reaction vessel includes the usual polymerization equipment and in some cases provisions for operating under pressure are required. An inert gas, as nitrogen, is usually used to flush the reaction mixture and maintain an inert gas atmosphere in the reaction vessel during the polymerization period. Delayed addition techniques—where one or both monomers are added in increments as the copolymerization proceeds, usually is advantageous; as copolymers of more uniform composition are obtained. The reaction mixture is heated and the copolymerization proceeds readily at temperatures of from about 50° C. to about 125° C. The reaction may be interrupted before completion, if desired; generally the copolymerization is substantially complete in about 2 to 8 hours or more. Any unreacted monomers may be removed if desired. Copolymerization products obtained after the copolymerization is from about 90 percent to about 100 percent complete, may be used directly in many applications without removal or separation of solvent or unreacted materials. Generally, vinyl acetate will comprise the major portion of any unreacted materials.

As indicated, certain solvents will affect the molecular weight of the copolymer producted. To obtain satisfactory high molecular weight copolymers, a solvent modifier should be present in or added to the copolymerization solvent system. Suitable modifiers include aliphatic and aromatic esters, and higher aliphatic alcohols. By varying the amount of modifier up to about 30 percent by weight of the solvent system, one can readily control the copolymer product molecular weight.

Delayed addition techniques are preferred for preparing the vinyl acetate-alkoxy polyalkylene glycol unsaturated dicarboxylic acid half esters copolymers, that are to be used in adhesive applications of this invention. Generally the copolymerizable half ester should be added during the reaction to maintain the half ester at a percentage value of from about 0.5 percent to about 20 percent by weight of the unreacted vinyl acetate. Advantageous and uniform copolymers containing about 80 percent to 90 percent vinyl acetate are prepared by maintaining the half ester concentration, during copolymerization, at about 1 percent to about 6 percent by weight of the unreacted vinyl acetate. A preferred solvent system for preparing these copolymers comprises toluene, and ethyl acetate as the solvent modifier. The amount of toluene should be about one half the total volume of monomers to about equal the total volume of monomers. Ethyl acetate in amounts up to 30 percent by weight of the toluene is useful. Increasing the amount of ethyl acetate in the toluene will result in increased copolymer molecular weight; this permits control of copolymer molecular weight. An amount of ethyl acetate that is in the range from about 5 percent to about 30 percent by weight of the toluene used, is satisfactory for producing the copolymers with the desired intrinsic viscosity. The copolymerization reaction can be conducted whereby all of the monomers are consumed. A product copolymer solution especially useful in the adhesive procedures of this invention, contains after complete copolymerization, about 40 percent to 60 percent copolymer solids, 35 percent to 60 percent toluene, and 1 percent to 20 percent ethyl acetate, by weight of the total solution. Another useful product copolymer solution is obtained by stopping the polymerization reaction before completion or utilizing an excess of half ester in the reaction mixture. These product solutions contain about 40 percent to 60 percent copolymer solids, 35 percent to 60 percent toluene, 1 percent to 20 percent ethyl acetate, and 0.5 percent to 15 percent unreacted half ester, by weight of the total solution. These solutions are useful in the adhesive application where the plasticizing effect of the unreacted half ester is desired.

The copolymerizable monomeric esters utilized to prepare the vinyl acetate copolymers used as the water insoluble-organic solvent soluble polymeric material in the adhesive mixtures or coating compositions, previously described, can be readily prepared by the usual and well known esterification techniques. Generally the unsaturated acid is reacted with the alkoxy polyalkylene glycol or alkoxy alkylene glycol, in the presence or absence of a solvent system or an esterification catalyst. Heating of the reaction mixture is usually required. Particularly suitable monomeric esters are the alkoxy polyalkylene glycol unsaturated dicarboxylic acid half esters. These materials, described in the following, are used to prepare the vinyl acetate copolymers of this invention. Reactions where the glycol reacts with an unsaturated dicarboxylic acid; or reactions where the glycol reacts with an unsaturated dicarboxylic acid anhydride, may be used. The terms acids, acid materials, are used in this specification and claims to indicate the acid or anhydride. Esterification procedures utilizing the unsaturated acid anhydride are particularly advantageous. Whatever reaction procedures are used to prepare the half esters, the reaction conditions should be controlled or separation techniques should be utilized in order that the half ester is obtained. That is, the procedures used should yield a polymerizable acid half ester compound that has one free carboxyl function or group.

These monomeric compounds of this invention are useful as a surface active agent in aqueous polymerization systems, dispersion or suspension stabilizers, and plasticizers for polymeric materials.

As previously indicated the polymerizable acid half esters may be prepared by esterification procedures. These procedures involved the esterification of unsaturated dicarboxylic acid type materials by alkoxy polyalkylene glycols. The term acid type materials is used to indicate the usual unsaturated dicarboxylic acids, as well as the anhydrides, when available, of these acids. These acids may be termed olefinic dicarboxylic acids. Examples of acids include, fumaric acid, maleic acid, itaconic acid, citraconic acid, mesaconic acid, glutaconic acid, alkyl itaconic acids, alkyl maleic acids, alkyl fumaric acid, and alkyl glutaconic acids. Examples of anhydrides include maleic anhydride, citraconic anhydride, itaconic anhydride, alkyl citraconic acid anhydrides, dialkyl maleic acid anhydrides; and in general anhydrides of the previously named acids, if these anhydrides can be prepared. In general the acid type material should contain at least two carboxyl functions and ethylenic unsaturation.

The alkoxy polyalkylene glycols useful in the esterification procedures may be also termed alkoxy polyoxy alkylene glycols or polyoxyaylkylene glycol monoalkyl ethers. The alkoxy glycols have recurring oxyalkylene groups, a terminal alkyl ether linkage and a terminal hydroxyl group. Since these compounds are made by a condensation type reaction the compounds are a mixture of many compounds with variations in the number of oxyalkylene groups.

Detailed descriptions of these glycol materials and descriptions of preparative methods are contained in U.S. Patents, 2,213,477; 2,448,664; 2,425,755; 2,677,700; and 2,942,033. These alkoxy glycols have recurring oxyalkylene groups with a terminal alkyl ether linkage and a terminal hydroxyl group. These alkoxy-glycols are generally a mixture of compounds having variations in the number of recurring oxyalkylene groups. These compounds or mixtures may be described in terms of the average number of oxyalkylene groups in the compounds comprising the mixture. These compounds may also be described in terms of their average molecular weight and hydroxyl content. For accurate control of the esterification reaction, the actual hydroxyl content of the alkoxy-glycol should be determined by analysis. Useful alkoxy-glycols include those where the alkoxy group is methyl, ethyl, or propyl; and where the average molecular weight is from about 200 to about 1200; and where the recurring oxyalkylene group contains up to about five carbon atoms. The preferred alkoxy-glycols for use in preparing the half esters used in preparing vinyl acetate copolymers used in the adhesive techniques of this invention, correspond to the general formula

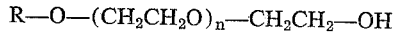

$$R-O-(CH_2CH_2O)_n-CH_2CH_2-OH$$

where R is a lower alkyl group, as methyl, ethyl, and propyl; and where $n$ has an average value of from about 5 to about 25; or where the average molecular weight is from about 275 to about 1000. These compounds are termed alkoxy polyethylene glycols. Advantageous half esters are prepared from alkoxy glycols having an average value of $n$ from about 6 to about 17; or where the average molecular weight is from about 300 to 750. Preferred are alkoxyglycols where R is methyl; this compound being termed methoxy polyethylene glycol or polyoxyethylene glycol monomethyl ether. Commercially available alkoxy polyethylene glycols are suitable for use in the procedures of this invention.

Esterification of the unsaturated dicarboxylic acid type materials by the polyoxyalkylene glycol monoalkyl ether is controlled or conducted so that the half ester, or the polyoxyalkylene glycol monoalkyl ether unsaturated dicarboxylic acid half ester, is produced. The usual esterification procedures and techniques may be used. In general, the reaction may be readily conducted by preparing a reaction mixture having a ratio of about one mole by weight of acid material to about one mole by weight of the alkoxy-glycol. A determination of the hydroxyl number of the alkoxy-glycol should be made to determine the exact amount of alkoxy-glycol that is required. In some cases, the esterification should be conducted in a solvent as toluene, xylene, or other suitable organic solvents. Also, an esterification catalyst may be needed; in this case any suitable catalyst may be used; p-toluene sulfonic has been found to be useful. Further, in some cases, the alkoxy-glycols may be solids or semi-solids and a solvent reaction medium is needed to dissolve the glycol. The reaction mixture is heated to and maintained at a temperature of from about 80° C. to about 120° C., or the reaction is run at reflux temperature. The extent of the reaction is determined by periodic analysis for the acid number or for unreacted carboxyl function. The reaction is normally completed in about from 2 to 50 hours. By suitable choice of reaction conditions and reactants ratios it is possible to obtain only the half ester product, with small amounts of unreacted acid material or alkoxy-glycol in the product. However, it may be advantageous in some instances to conduct the reaction with an excess of acid material or glycol. If desired, unreacted materials may be removed by distillation or extraction techniques.

It has been found that more satisfactory results and easier production of the half ester is obtained if the unsaturated dicarboxylic acid anhydride is used in the esterification procedure of this invention. With the anhydride a reaction solvent is usually not required and usually a catalyst is not required. Solvents are required only when none of the reactants are liquids under reaction conditions. The reaction is conducted at a temperature of about 80° C. to about 100° C., and preferably at about 90° C. Using this procedure results in production of only the half ester. Unreacted materials, if present, may be removed by conventional separation techniques. Advantageously, if a solvent is required in this esterification; and the half ester is to be used for copolymer preparation, the solvent should be the same as the solvent used with copolymerization system. For example, to copolymerize the half ester and vinyl acetate in toluene, one may utilize directly the product half ester solution obtained by the esterification in toluene. A preferred anhydride is maleic anhydride.

The half esters prepared by the esterification process are alkoxy polyalkylene glycol unsaturated dicarboxylic acid half esters corresponding to reaction products of the acid materials and alkoxy-glycols previously mentioned. For example, alkoxy polyethylene glycol maleate, alkoxy polyethylene glycol fumarate, alkoxy polyethylene glycol alkyl maleate, methoxy polyethylene glycol maleate, ethoxy polyethylene glycol maleate, propoxy polyethylene glycol maleate, methoxy polyethylene glycol fumarate, and others.

The following examples are illustrative of the inventive materials, compositions, procedures, and techniques of this invention and are not intended to limit the scope or area of this invention. Examples 1 to 3 relate to esters; Examples 4 to 11 relate to copolymers; and Example 12 relates to adhesives.

*Example 1*

A methoxy polyethylene glycol maleate half ester was prepared according to the procedures of this invention. The reaction vessel used was a three neck-one liter round bottom flask, fitted with a thermometer, a gas inlet tube, and a mechanical stirrer. Heating of the flask was provided by a steam bath. Ninety-eight grams (1 mole) of maleic anhydride was added to the reaction vessel containing three hundred and fifty grams (1 mole) of a methoxy polyethylene glycol having an average molecular weight of 350. The maleic anhydride dissolved rapidly in the liquid glycol. The reaction mixture solution was then heated to and maintained at about 90° C. for about 12 hours. During the reaction, the reaction mixture was continuously titrated until a constant acid number was obtained. The reaction mixture was then cooled at room temperature. The final acid number was 253. Conversion of the reactants was equal to 98 percent. The reaction product is methoxy polyethylene glycol maleate half ester with a small amount of unreacted materials; the unreacted materials may be removed, or the product used directly in the copolymerization procedures. The half ester is a liquid.

Similar half esters were prepared using this procedure and using glycols having an average molecular weight in the range of 335 to 365. These half esters had a melting point in the range of about 0° C. to 10° C.; and an acid number of about 250 to 255.

*Example 2*

Utilizing the procedures of Example 1, a half ester was prepared by using a methoxy polyethylene glycol having an average molecular weight of 550; the amount glycol charged was 550 grams. Reaction temperature was about 90° C. and after 13 hours an 86 percent conversion was obtained. Final acid number was 99.

Other half esters were similarly prepared using glycols having an average molecular weight of about 525 to 575; the half esters obtained had a melting point of about 15° C. to 25° C.; and an acid number of about 87 to 100.

*Example 3*

The procedures used were essentially those of Example 1. In these runs the starting glycol was a solid and had to be heated to obtain a liquid reaction mixture. The methoxy polyethylene glycol charged had an average molecular weight of about 750; and the glycol charged was 750 grams. After 40 hours at 90° C., an 83 percent conversion was obtained; final acid number was 77.

Using glycols having an average molecular weight of 715 to 783, similar half esters were prepared. They had a melting point of about 30° C. to 35° C. and an acid number of about 66 to 80.

*Example 4*

Copolymers of vinyl acetate and methoxy polyethylene glycol maleate half ester were prepared. The reaction vessel was a 24 liter resin kettle; fitted with a thermometer, gas inlet tube, mechanical stirrer, and dropping funnel. The kettle was heated electrically. The reactant mixture charged to the reaction vessel was:

| | Grams |
|---|---|
| Vinyl acetate | 1500 |
| Methanol | 1500 |
| Methoxy polyethylene glycol maleate half ester of Example 1 | 37.5 |
| Azobisisobutyronitrile | 3 |

The methoxy polyethylene glycol maleate half ester was prepared according to Example 1. The reactants were heated to and maintained at a polymerization temperature of 60° C. The induction period was about 15 minutes. The reaction mixture was continuously analyzed for free vinyl acetate. Hydroquinone was added to the reaction mixture after 13.3 percent of the vinyl acetate had reacted. Unreacted vinyl acetate and the methanol were removed. The copolymer was dissolved in toluene; the toluene contained 51 percent copolymer solids. The copolymer contained about 82 percent vinyl acetate and 18 percent half ester by weight. The final toluene solution contains a small amount of unreacted half ester.

*Example 5*

A copolymer was prepared using the procedures of Example 4, with a charge of:

| | Grams |
|---|---|
| Vinyl acetate | 1500 |
| Methanol | 1500 |
| Half ester of Example 2 | 37.5 |
| Azoisobutyronitrile | 1.5 |

The reaction was stopped at 6.4 percent conversion of the vinyl acetate. Copolymer contained about 72 percent vinyl acetate and 28 percent half ester. A solution containing 35 percent by weight of the copolymer in toluene was prepared.

*Example 6*

A vinyl acetate copolymer was prepared using the procedure of Example 4. The charge was:

| | Grams |
|---|---|
| Vinyl acetate | 1500 |
| Methanol | 1500 |
| Half ester of Example 3 | 37.5 |
| Azobisisobutyronitrile | 1.5 |

Polymerization stopped at 11.8 percent conversion of vinyl acetate. Copolymer contained about 95 percent vinyl acetate and 5 percent half ester. Toluene solution was 59 percent copolymer solids.

*Example 7*

Using the equipment described in Example 4, and an initial charge was introduced into the vessels, containing the following:

| | Grams |
|---|---|
| Vinyl acetate | 600 |
| Toluene | 30 |
| Half ester of Example 1 | 10 |

The mixture was heated to 70° C. and 1 gram of azobisisobutyronitrile was added. The induction period was about 15 minutes. Then delayed addition during next 2 hours of the following mixture:

| | Grams |
|---|---|
| Toluene | 50 |
| Half ester of Example 1 | 50 |

Also added by delayed addition during the 2 hour period was the following mixture:

| | Grams |
|---|---|
| Toluene | 100 |
| Azobisisobutyronitrile | 6 |

After all of the incremental additions were complete, the reaction mixture was slowly heated for 2 hours, to a final temperature of 105° C. Vinyl acetate conversion was 92 percent. The copolymer contained about 91 percent vinyl acetate and 9 percent half ester. A toluene solution containing 58.6 percent of copolymer solids was prepared.

*Example 8*

A vinyl acetate copolymer was prepared using procedures described in Example 5.

| Initial charge was: | Grams |
|---|---|
| Vinyl acetate | 600 |
| Toluene | 200 |
| Half ester of Example 1 | 10 |

| Delayed addition charges were: | Grams |
|---|---|
| Toluene | 110 |
| Half ester of Example 1 | 110 | and

| | Grams |
|---|---|
| Toluene | 100 |
| Azobisisobutyronitrile | 5 |

The final reaction temperature was 101° C. Vinyl acetate conversion was 89 percent. The copolymer contained about 86 percent vinyl acetate and about 14 percent half ester. The toluene solution contained 59.9 percent solids.

*Example 9*

Procedures of Example 7 were employed.

| Initial charge was: | Grams |
|---|---|
| Vinyl acetate | 600 |
| Half ester of Example 1 | 7 |

| Delayed charges were: | Grams |
|---|---|
| Toluene | 80 |
| Half ester of Example 1 | 80 | and

| | Grams |
|---|---|
| Toluene | 100 |
| Azobisisobutyronitrile | 5 |

The final reaction temperature was 105° C. Heating after the two hour period of delayed charge addition was for three hours. Vinyl acetate conversion was 88 percent. The copolymer contained about 87 percent vinyl acetate and 13 percent half ester. The toluene solution had 43 percent solids.

*Example 10*

Copolymers were prepared using the procedures of Example 7.

Initial charge was:

| | Grams |
|---|---|
| Vinyl acetate | 600 |
| Half ester of Example 1 | 7 |
| Ethyl acetate | 100 |

Delayed charges were:

| | Grams |
|---|---|
| Half ester of Example 1 | 83 | and

| | Grams |
|---|---|
| Toluene | 400 |
| Azobisisobutyronitrile | 5 |

The final reaction temperature was 97° C. Vinyl acetate conversion was 98 percent. The copolymer contained about 88 percent vinyl acetate and 12 percent half ester. The toluene-ethyl acetate contained 52.5 percent solids.

A second copolymer was prepared using the above procedures, and increasing the amount of half ester. This copolymer contained about 95 percent vinyl acetate and 5 percent half ester. The toluene ethyl acetate solution contained 50.1 percent solids.

*Example 11*

Copolymers were prepared using the procedures of Example 10 and increasing the amount of half ester. Copolymers containing 38 percent vinyl acetate and 62 percent half ester were water soluble.

*Example 12*

In a series of experiments or runs, gummed papers or remoistenable adhesive coated papers were prepared utilizing the procedures of this invention. The following results and product descriptions are representative of the materials produced. In general, a solution of the water insoluble polymeric material in the organic solvent system indicated in Table I below was prepared. The dextrine was added to the solution. In some cases the dextrine was dry ground, prior to being added to the solution, to obtain satisfactory particle size or degree of fineness. The solution was agitated while the dextrine was being added; the agitation was continued until a uniform or homogeneous suspension, dispersion or mixture was obtained. This was the adhesive coating composition. The coating composition was applied to paper sheet material; the paper was of the type used for gummed paper tapes. Standard drying procedures were used to obtain paper having a thin coating of the substantially dry water-activatable adhesive mixture. Drying resulted in the removal of the organic solvent system. The dried gummed paper was non-curling and stable upon storage.

The coating compositions contained about 85 parts by weight dextrine, about 4 parts polymeric material, and about 50 parts solvent system. Table I is a list of various representative coating compositions that were prepared. The water insoluble-polymeric materials used were the copolymers prepared in Examples 4 to 10.

TABLE I

| Run No. | Solvent System | Number of Copolymer Example | Percentage by Weight of Vinyl Acetate in Copolymers | Percentage Weight of Half Esters in Copolymers |
|---|---|---|---|---|
| 1 | Toluene | 2 | 82 | 18 |
| 2 | do | 3 | 72 | 28 |
| 3 | do | 4 | 95 | 5 |
| 4 | do | 5 | 91 | 9 |
| 5 | do | 6 | 86 | 14 |
| 6 | do | 7 | 87 | 13 |
| 7 | 20% Ethyl acetate, 80% Toluene. | 8 | 88 | 12 |
| 8 | 23% Ethyl acetate, 80% Toluene. | 8 | 95 | 5 |

Using the copolymer of Example 7 adhesive coating compositions were prepared. One composition contained about 55 percent dextrine; about 31 percent toluene; and about 14 percent of the copolymer, by weight. Another composition contained about 60 percent dextrine; about 32 percent toluene; and about 8 percent of the copolymer by weight. Compositions similar to these were also prepared where partially hydrolyzed polyvinyl alcohol was substituted for the dextrine.

As previously indicated, gummed paper products were made using all of the above described compositions. These products had satisfactory and improved properties and presented no curling problems when subjected to wide variations in humidity at room temperature. The products maintained their desirable properties after prolonged storage periods.

The gummed paper products were evaluated in terms of remoistenable adhesion, blocking, film adhesion, film stability, and curl. Remoistenable adhesion was determined by McLaurin test values. The McLaurin test procedures are described in TAPPI, November 1959, vol. 42, No. 1, p. 899. In this test adhesive coating on a gummed paper sample was moistened and the wet paper was pressed to a clean sample. The test values indicated the resistance of the papers to separation. The paper products of this invention had McLaurin test values equivalent to or superior to standard tape products.

Blocking relates to the problem of the gummed paper becoming tacky and uniting with adjacent paper surfaces prior to use. That is, the adhesive layer is usually in direct contact with a paper surface prior to use, and it will form a bond with this surface. This is due to the remoistenable adhesive being activated by atmospheric moisture. Film adhesion is the ability of the dried adhesive coating to adhere to the paper. It can be determined by applying a pressure sensitive adhesive tape to the coating; then determining if the remoistenable adhesive is removed when the pressure sensitive tape is pulled off. Film stability can be measured readily by determining the amount of dried adhesive layer that falls from the coating. Curling is the tendency of the gummed tape to roll up; that is, the gummed paper may not remain flat during storage prior to use.

All of the gummed paper products prepared were evaluated; were found to be equivalent or superior to standard products in terms of remoistenable adhesion, blocking, film adhesion, film stability, and curl, characteristics.

While preferred embodiments of this invention have been described and illustrated, it is to be understood that widely different modifications of the invention may be made without departing from the scope and spirit of the invention. The invention is not to be limited by the foregoing examples and details of description except as defined in the following claims.

I claim:

1. Compositions comprising a water soluble-organic solvent insoluble remoistenable adhesive and a water insoluble-organic solvent soluble polymeric material, the weight ratio of said adhesive to said polymeric material being within the range of from about 1:2 to about 100:1, said polymeric material being selected from the group consisting of vinyl acetate-alkoxy polyalkylene glycol unsaturated dicarboxylic acid half ester copolymers, and vinyl acetate-alkoxy polyalkylene glycol unsaturated monocarboxylic acid ester copolymers.

2. Compositions comprising about 45 percent to 65 percent of a water soluble-organic solvent insoluble remoistenable adhesive, about 5 percent to 20 percent of a water insoluble-organic solvent soluble polymeric material, and about 20 percent to 50 percent of an organic solvent system, said polymeric material being selected from the group consisting of vinyl acetate-alkoxy polyalkylene glycol unsaturated decarboxylic acid half ester copolymers, and vinyl acetate-alkoxy polyalkylene glycol unsaturated monocarboxylic acid ester copolymers.

3. Compositions according to claim 2 where said polymeric material comprises a vinyl acetate-methoxy polyethylene glycol maleic acid half ester.

4. Compositions according to claim 1, where said adhesive and said polymeric material comprise from about 20 percent to about 90 percent by weight of said composition, and where said composition contains from about 10 percent to about 80 percent by weight of said composition of an organic solvent system.

5. Compositions according to claim 4, where said polymeric material comprises a vinyl acetate-alkoxy polyethylene glycol maleic acid half ester, and where said solvent system comprises a mixture of toluene and ethyl acetate.

6. Compositions according to claim 1 where said polymeric material comprises a vinyl acetate-methoxy polyethylene glycol maleic acid half ester.

7. Compositions according to claim 2 where the polymeric material is a vinyl acetate-methoxy polyethylene glycol maleic acid half ester containing about 87 percent by weight vinyl acetate and about 13 percent by weight methoxy polyethylene glycol maleic acid half ester.

8. Gummed products incorporating surface coatings comprising a substantially dry mixture of a water soluble-organic solvent insoluble remoistenable adhesive and a water insoluble-organic solvent soluble polymeric material, said dry mixture having substantially uniform distribution of said adhesives and said polymeric material, said polymeric being selected from the group consisting of vinyl acetate-alkoxy polyalkylene glycol unsaturated dicarboxylic acid half ester copolymers, and vinyl acetate-alkoxy polyalkylene glycol unsaturated monocarboxylic acid ester copolymers.

9. Gummed paper products having a remoistenable adhesive surface coating where said coating comprises a substantially dry mixture of a water soluble organic solvent soluble remoistenable adhesive and a water insoluble vinyl acetate-methoxy polyethylene glycol maleic acid half ester copolymer.

10. Copolymers containing from about 75 percent to about 95 percent by weight of vinyl acetate units, and from about 5 percent to 25 percent by weight of alkoxy polyalkylene glycol unsaturated dicarboxylic acid half ester units, said half ester units having an average molecular weight of from about 250 to about 1400.

11. Copolymers according to claim 10 where said half esters are selected from the group consisting of methoxy polyethylene glycol maleic acid half esters, ethoxy polyethylene glycol maleic acid half esters, and propoxy polyethylene glycol maleic acid half esters and where said half esters have an average molecular weight of from about 350 to about 900.

12. Copolymers according to claim 11, where said half esters are methoxy polyethylene glycol maleic acid half esters.

13. Copolymers according to claim 12, where said half esters have an average molecular weight of from about 350 to about 400.

14. Copolymers according to claim 13, where said vinyl ester units are about 87 percent by weight, and where said half ester units are about 13 percent by weight.

15. Alkoxy polyalkylene glycol unsaturated dicarboxylic acid half esters having an average molecular weight of from about 250 to about 1400, where the substituted unsaturated acid of said half ester is selected from the group consisting of maleic acid, fumaric acid, itaconic acid, citraconic acid, mesaconic acid, glutaconic acid, alkyl itaconic acids, alkyl maleic acids, alkyl fumaric acids, and alkyl glutaconic acids; and where the substituted alkoxy polyalkylene glycol of said half ester has an average molecular weight of from about 200 to about 1200 and is selected from the group consisting of methoxy polyalkylene glycol, ethoxy polyalkylene glycol, and propoxy polyalkylene glycol.

16. Acid half esters according to claim 2 comprising methoxy polyethylene glycol unsaturated dicarboxylic acid half esters having an average molecular weight of from about 350 to about 900.

17. Alkoxy polyethylene glycol maleic acid half esters where the substituted alkoxy polyethylene glycol of said maleic acid half ester has an average molecular weight of from about 300 to about 750 and is selected from the group consisting of methoxy polyethylene glycol, ethoxy polyethylene glycol, and propoxy polyethylene glycol.

18. Methoxy polyethylene glycol maleic acid half esters having an average molecular weight of from about 350 to about 900.

19. The method of preparing acid half esters which comprises reacting an acid anhydride selected from the group consisting of maleic anhydride, citraconic anhydride, itaconic anhydride, alkyl citraconic anhydrides, and dialkyl maleic anhydrides with an alkoxy polyethylene glycol having an average molecular weight from about 200 to about 1200.

20. The method according to claim 6 where the anhydride is maleic anhydride and the glycol is methoxy polyethylene glycol.

References Cited

UNITED STATES PATENTS

| 3,061,562 | 10/1962 | Grenlez et al. | 260—17.4 |
| 3,072,617 | 1/1963 | Fields | 260—78.5 |
| 3,076,791 | 2/1963 | Hollyday et al. | 260—78.5 |
| 3,078,241 | 2/1963 | Hibbard et al. | 260—17.4 |

WILLIAM H. SHORT, Primary Examiner.

J. NORRIS, Assistant Examiner.